United States Patent

Miura et al.

[15] 3,678,214

[45] July 18, 1972

[54] MAGNETIC TAPE UNLOADING MECHANISM FOR USE WITH A TAPE RECORD PLAYBACK MECHANISM

[72] Inventors: Yotaro Miura, Toyko; Makoto Ito, Chiba-ken, both of Japan

[73] Assignee: Sony Corporation, Toyko, Japan

[22] Filed: Aug. 21, 1970

[21] Appl. No.: 65,811

[30] Foreign Application Priority Data

Jan. 24, 1970 Japan....................................45/6486

[52] U.S. Cl.............................179/100.2 T, 226/5, 226/174, 226/198

[51] Int. Cl...........................................................G11b 5/76

[58] Field of Search......................226/5, 168, 174, 198, 199, 226/200; 179/100.2 T, 100.2 C

[56] References Cited

UNITED STATES PATENTS

| | | | |
|---|---|---|---|
| 2,560,254 | 7/1951 | Schickel | ..........................226/199 UX |
| 3,564,158 | 6/1968 | Horton | ............................179/100.2 T |

*Primary Examiner*—Richard A. Schacher
*Attorney*—Lewis H. Eslinger, Alvin Sinderbrand and Curtis, Morris & Safford

[57] ABSTRACT

A mechanism for automatically removing a magnetic tape from around a drum having magnetic heads therein for recording and playing back signals on the magnetic tape. An arm which is pivoted has one end which bears against the tape. A slide member moves the arm upwardly and away from the tape to eject the tape up and away from the rotating drum. The rotary movement of the drum facilitates the ejection of the tape.

8 Claims, 2 Drawing Figures

INVENTOR.
YOTARO MIURA
MAKOTO ITO
ATTORNEYS

MAGNETIC TAPE UNLOADING MECHANISM FOR USE WITH A TAPE RECORD PLAYBACK MECHANISM

Tape recorders including video tape recorders have become a very popular source of entertainment. The components comprising these tape recorders are very complicated and sophisticated mechanisms.

Generally the magnetic tape is included within a cassette where the tape is wound on a take-up and a supply reel. The portion of the magnetic tape between the reels is formed into a loop and draped around the drum having the magnetic heads therein. Since each end of the tape is fixed to a respective reel, the tape is not merely withdrawn from around the drum after the tape has been transferred from one reel to the next. It is, therefore, necessary to lift the loop of magnetic tape off the drum whereby it will be rewound onto one reel within the cassette.

This invention provides a mechanism for automatically removing the looped tape from around the periphery of the drum by using a simple and inexpensive structure to accomplish this result.

Basically the tape is looped around the periphery of a rotating drum and is aided in its location by an upstanding guide member. A pivotable spring-biased arm has one end which is closely spaced from the periphery of the drum and fits within an opening adjacent a finger on a movable bracket. When a signal to "eject" is given, the bracket moves upwardly and forces the arm upwardly and against the tape wherein the tape is physically slid off the periphery of the drum and is then wound into the cassette onto one of the reels.

It is a principal object of the invention to provide a tape ejection mechanism for a tape recorder where the magnetic tape surrounds a rotatable drum.

It is further object of the invention to provide a tape ejection mechanism which is simple to fabricate, has few moving parts and is inexpensive to manufacture.

It is an additional object of the invention to provide a tape removing mechanism which moves a tape out of engagement with a guide post.

Further objects and advantages of the present invention will become apparent as the following description proceeds and the features of novelty which characterize the invention will be pointed out with particularity in the claims annexed to and forming a part of this specification.

Figure 1:
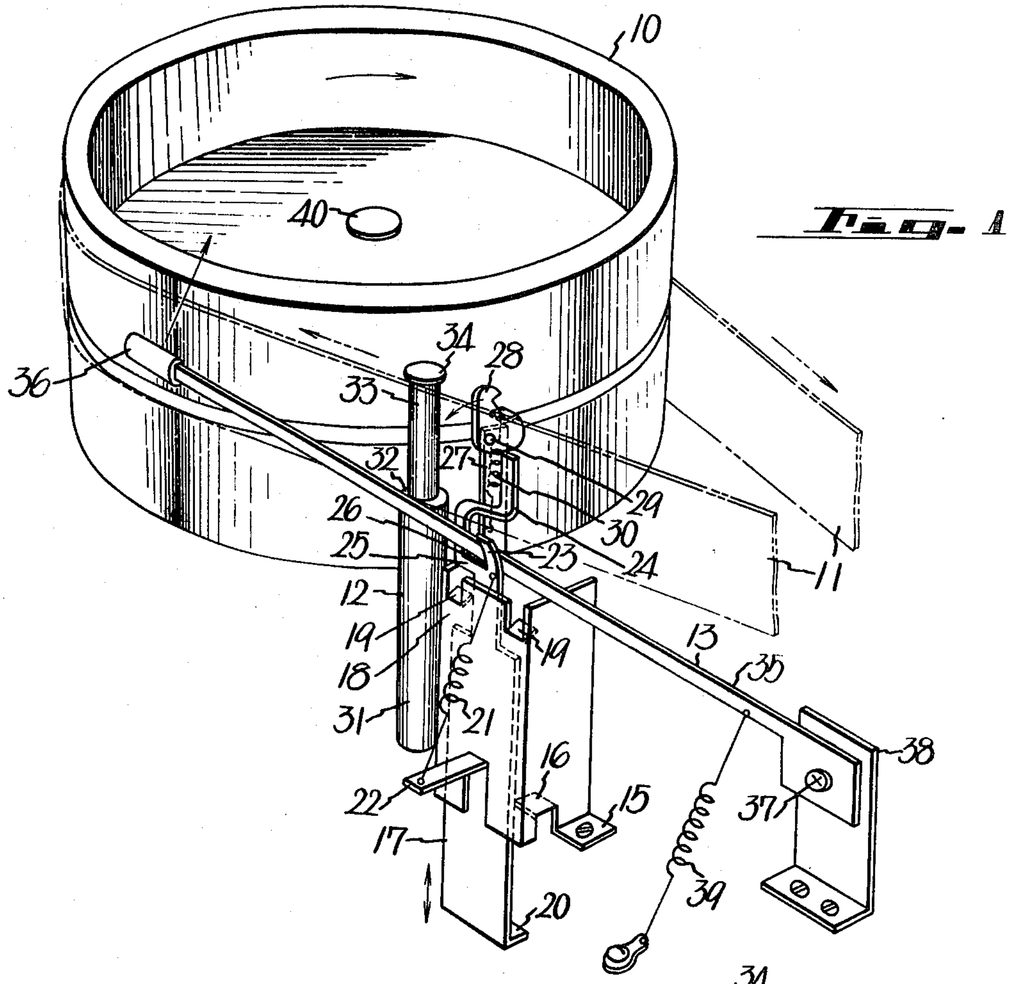
Figure 2:
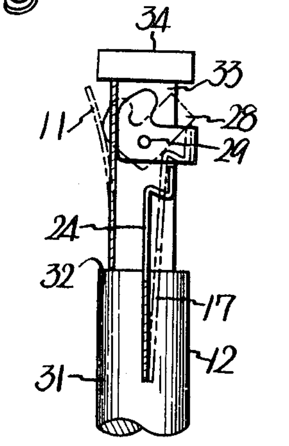

For a better understanding of the present invention, reference may be had to the accompanying drawings in which:

FIG. 1 is a perspective view showing the tape ejection mechanism in relation to a drum having magnetic tape thereon, and FIG. 2 is a detail view of the tape ejection mechanism.

Referring to FIG. 1, there is shown a drum 10 of which at least an upper half is rotatably mounted on the chassis of a tape recorder. The drum has magnetic pick-up heads (not shown) secured to one half of the drum such that the heads can scan the magnetic tape 11 as it moves over the drum 10.

An upstanding guide post 12 guides the tape 11 during its travel over the drum 10 and limits inward movement of the tape. A tape ejection mechanism 13 is mounted adjacent the drum 10 and is secured to the chassis (not shown) of the tape recorder.

The tape ejection mechanism comprises a bracket 14 which has a U-shaped configuration. The bracket has flanged feet 15 thereon which are bolted or otherwise secured to the chassis. A pair of opposed tabs 16 are bent inwardly from the sides of U-shaped bracket 14 and serve to maintain the slide member 17 against the bight 18 of the bracket 14. A pair of tabs 19 which are formed and bent inwardly on the bight portion 18 of the bracket 14 serve to move inwardly the slide member 17 which is moving upwardly. The slide member 17 can have a flange 20 thereon on the lower portion thereof. The slide member 17 is moved by any known actuating member (not shown) such as an arm connected to an "eject" button which the user depresses. The slide member 17 is biased toward the base of the chassis by a spring 21 which has one end secured to an upper portion of the slide member 17 and its other end secured to an outstanding tab 22 which is formed on the front wall 18 of the U-shaped bracket 14. The slide member 17 includes a curved finger 23 and a Z-shaped extension 24. A connecting link 25 joins the Z-shaped extension 24 to the curved finger 23 thereby forming a U-shaped opening 26 therein. Adjacent the top leg of the Z-shaped extension is a portion 27 which functions as a support for a pivoted toggle 28 which pivots around the pin 29. A spring 30 having one end secured to the Z-shaped extension and the other end secured to the toggle 28 is biased in a clockwise direction by the spring 30.

The tape 11 is guided in its movement by a tape guide 12 which comprises a post 31 having a shoulder 32 thereon and a guide shaft 33 fixed to the post 31 which is secured to the chassis. A head 34 is formed on the guide shaft 33. Thus, the tape 11 rides in the groove formed by the shoulder 32 on one end and the head 34 on the other. The toggle 28 is adjacent the head 34 whereby movement of the toggle 28 in a counterclockwise direction will bias the tape 11 out of the groove formed between the head 34 and the shoulder 32.

The open portion 26 between the finger 23 and the lower leg of the Z-shaped extension 24 provides an area for the longitudinal arm 35 in which to rest. The longitudinal arm preferably has a frictional tape gripping member 36 thereon which is preferably made of rubber, however, any desired material can be used which will not harm the tape 11 and can frictionally grip the tape. The arm 35 is pivotally mounted by a pin 37 on an upright bracket 38 which is bolted to the chassis or otherwise secured thereto. A coil spring 39 is secured at one end to the longitudinal arm 35 and the other end is secured to the chassis.

To operate the tape ejection mechanism, the operator presses the "eject" button (not shown) which is linked to the slide member 17 by any known linkage mechanism or a solenoid can be used in which the bracket 14 is the armature and the slide 17 is the plunger. The slide member 17 is pushed upwardly as shown in FIG. 1 against the bias of the spring 21. The longitudinal arm 35 is biased downwardly toward the chassis by the spring 39 and is pulled away from the drum 10 so that it effectively bears against the curved finger 23. Thus, as the slide member 17 moves upwardly, the longitudinal arm 35 is constrained to move against the tape 11 and the outward bias of the spring 39 tends to pull the arm outwardly so as to sweep the arm readially away from the drum 10 after the tape gripping member 36 contacts the tape and at the upper part of its travel. The rotational movement of the drum 10 about the axis 40 assists in removing the tape from the periphery of the drum. Just prior to the tape engaging member 36 engaging the tape 11 to sweep it from the face of the drum 10, the Z-shaped extension 24 strikes the toggle 28 and pivots it counterclockwise against the bias of the spring 30. The toggle 30 then urges the tape 11 away from under the head 34. The tape 11 can now be readily moved upwardly off the drum 10 by the arm 35 where a take-up reel (not shown) reels it upon the reel for storage thereon.

While there has been shown and described a single embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by letters patent of the United States is:

1. A mechanism for unloading a magnetic tape from around a drum in a tape recorder comprising, a. A chassis having a drum mounted thereon, b. said magnetic tape being looped around said drum, and c. a tape ejection means including a resiliently mounted arm which is pivotally secured to the chassis adjacent said drum and actuating means operatively engaged with said arm to pivot the arm whereby the arm contacts the tape on the drum and removes the tape therefrom, said actuating means comprising a resiliently biased plate slidably secured to a bracket fixed to the chassis adjacent the drum and spaced from the pivot point of said pivotally mounted arm.

2. A mechanism for unloading a magnetic tape as defined in claim 1, in which said resiliently biased plate has a curved portion thereon in which the direction of the curve is upward and laterally away from the drum whereby the arm is constrained to upward movement.

3. A mechanism for unloading a magnetic tape as defined in claim 2, in which a tape guide is mounted adjacent said drum and tape biasing means is mounted in the path of movement of said resiliently biased plate such that said plate actuates said tape biasing means which biases the tape laterally away from said tape guide in the direction of said curved portion on said plate.

4. A mechanism for unloading a magnetic tape as defined in claim 3, in which said tape biasing means comprises a pivoted toggle which is adapted to urge the magnetic tape laterally away from the tape guide and the drum.

5. A mechanism for unloading a magnetic tape as defined in claim 4, in which said toggle is resiliently biased toward said drum.

6. In a magnetic recording and/or reproducing apparatus having a chassis, a cylindrical tape guide drum mounted at one end on said chassis for guiding a magnetic tape around at least a portion of the circumferential surface of said drum, and rotary magnetic head means associated with said drum for recording and/or reproducing signals on a magnetic tape while the latter is guided around said drum; a mechanism for removing the magnetic tape from around said guide drum comprising a member external to said guide drum and having a portion extending adjacent to said circumferential surface of the guide drum, means mounting said member movably on said chassis for movement of said portion generally in the axial direction of said guide drum toward the other end of the latter, and a frictional element on said portion of the movable member for frictionally engaging the tape guided around said drum and propelling the tape off said other end of the drum in response to said movement of said portion.

7. A magnetic recording and/or reproducing apparatus according to claim 6, in which said member is resilient and normally has said portion spaced radially outward from said circumferential surface to release said frictional element from the tape for permitting running of the tape about said guide drum, and said mechanism further comprises actuating means for effecting said movement in the axial direction and for flexing said member at the initiation of said movement to engage said frictional element with the tape on said drum.

8. A magnetic recording and/or reproducing apparatus according to claim 7, in tape guide means is mounted on said chassis adjacent said drum for engagement by the tape guided around said drum, tape deflecting means is mounted adjacent said tape guide means and is operative to deflect the tape away from the latter, and said actuating means operates said tape deflecting means simultaneously with the movement of said portion of the member in said axial direction.

* * * * *